US007212121B2

(12) United States Patent
Hashimoto et al.

(10) Patent No.: US 7,212,121 B2
(45) Date of Patent: May 1, 2007

(54) WIRELESS TAG SYSTEM, WIRELESS TAG ACCESS CONTROL DEVICE, WIRELESS TAG ACCESS CONTROL METHOD, WIRELESS TAG ACCESS CONTROL PROGRAM AND WIRELESS TAG

(75) Inventors: Shigeru Hashimoto, Inagi (JP); Tadashi Haeno, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 204 days.

(21) Appl. No.: 11/010,402

(22) Filed: Dec. 14, 2004

(65) Prior Publication Data

US 2006/0044113 A1 Mar. 2, 2006

(30) Foreign Application Priority Data

Aug. 26, 2004 (JP) ............................ 2004-246294

(51) Int. Cl.
*G08B 13/14* (2006.01)

(52) U.S. Cl. .................. 340/572.1; 340/571; 340/568; 340/539

(58) Field of Classification Search ............ 340/572.1, 340/571, 568, 539
See application file for complete search history.

(56) References Cited

U.S. PATENT DOCUMENTS 4,688,026 A 8/1987 Schibner et al. ............ 340/572
5,804,810 A * 9/1998 Woolley et al. ............ 235/492
6,076,023 A 6/2000 Sato .......................... 700/214
2004/0036623 A1* 2/2004 Chung .................. 340/825.49
2004/0046642 A1* 3/2004 Becker et al. .......... 340/10.32
2004/0142655 A1 7/2004 Voegele ........................ 455/1
2004/0212480 A1* 10/2004 Carrender et al. ....... 340/10.42
2005/0285742 A1* 12/2005 Charych et al. ......... 340/572.1

FOREIGN PATENT DOCUMENTS

EP 0 748 085 A1 12/1996
JP 2003-196360 7/2003

OTHER PUBLICATIONS

European Search Report dated Jun. 29, 2006.

* cited by examiner

*Primary Examiner*—Jeffery Hofsass
*Assistant Examiner*—Hongmin Fan
(74) *Attorney, Agent, or Firm*—Armstrong, Kratz, Quintos, Hanson & Brooks, LLP

(57) ABSTRACT

A wireless tag system which does not require any anti-collision process or, if an anti-collision process is required, can reduce the number of tags that need to participate in the anti-collision process to make the anti-collision process proceeds fast. The wireless tag system comprises a plurality of wireless slave tags which have respective unique IDs, a plurality of wireless master tags arranged for the slave tags and storing the unique IDs of the slave tags and a wireless tag access control device which accesses the master tags to acquire the unique IDs of the slave tags from the master tags and subsequently accessing the slave tags by using the acquired unique IDs of the slave tags.

20 Claims, 19 Drawing Sheets command format command code 0x00: Select master tag

All subsequent commands are regarded as commands for master tag command code 0x01: Select slave tags All subsequent commands are regarded as commands for slave tags command format

| command code | group address | data |
| --- | --- | --- |

e.g.) command code: 0x00
group address: 10
data: 0x80 command format command code 0x00: Only master tag moves into anti-collision processing mode command code 0x01: Only slave tags move into anti-collision processing mode command format

| command code | group address | data |
| --- | --- | --- |

command code: 0x00
group address: 10
data: 0x80

WIRELESS TAG SYSTEM, WIRELESS TAG ACCESS CONTROL DEVICE, WIRELESS TAG ACCESS CONTROL METHOD, WIRELESS TAG ACCESS CONTROL PROGRAM AND WIRELESS TAG

BACKGROUND OF THE INVENTION

1. Field of the Invention

This invention relates to a wireless tag system adapted to communications between a plurality of wireless tags (to be also referred to as IC tags hereinafter) and a read/write device and also to a wireless tag access control device, a wireless tag access control method, a wireless tag access control program and a tag that can be used for such a wireless tag system.

2. Description of Related Art

As a result of the rapid development of IC technologies in recent years, wireless tag systems using ICs have become very popular and are currently spreading very fast (see, inter alia, Patent Document 1: Jpn. Pat. Appln. Laid-Open Publication No. 2003-196360).

With such a wireless tag system, a plurality of wireless tags are attached to respective objects that have to be held under control so that any of the tags can be accessed by way of a read/write device in order to read information from and/or write information to it, thereby systematizing and facilitating the operation of controlling the objects of control.

When accessing a wireless tag (to be referred to simply as tag hereinafter), the read/write device firstly operates for an anti-collision process and acquires the unique IDs (to be referred to as UIDs hereinafter) of the tags of the system. Subsequently, it accesses the tag by using the acquired UID of the tag.

FIG. 21 of the accompanying drawings is a flow chart of the operation of the read/write device for an anti-collision process.

Referring to FIG. 21, the read/write device firstly transmits a group select command to the tags and waits for acknowledgements from the tags (Step S1). Then, it determines if it has properly received acknowledgements from the tags and acquired the UIDs of the tags (Step S2). If it is determined that the read/write device has properly acquired the UIDs (Step S2, Yes), the device transmits a read command (READ) to the tags and receives an acknowledgement from the tags (Step S3). Thereafter, the tags do not respond to any Fail command nor to any Success command from the read/write device.

Then, the read/write device determines if it has received acknowledgements consecutively for not less than a predetermined number of times (Step S4). If it is determined that it has not received acknowledgements for a predetermined number of times (Step S4, Yes), the read/write device terminates the process. If, on the other hand, it is determined that it has received acknowledgements for the predetermined number of times (Step S4, No), the read/write device transmits a Success command and receives an acknowledgement from the tags (Step S5).

On the other hand, if it is determined that the read/write device has not properly acquired the UIDs (Step S2, No), the read/write device determines if it has not received acknowledgements because there were collisions of acknowledgements from the tags (Step S6). If, on the other hand, it is determined that the read/write device has received acknowledgements (Step S6, Yes), it transmits a Fail command to the tags and receives an acknowledgement from the tags (Step S7).

If it is determined that the read/write device has not received acknowledgements because there were collisions of acknowledgements from the tags (Step S6, No), it determines if it has not received an acknowledgement from any of the tags or not (Step S8). If it is determined that the read/write device has not received an acknowledgement from any of the tags (Step S8, No), it terminates the process. However, if the read/write device has received at least an acknowledgement (Step S8, Yes), it proceeds to the above described processing operation of Step S4 and that of Step S5.

FIG. 22 of the accompanying drawings is a flow chart of the operation of a tag for an anti-collision process from the start of power supply.

Firstly, as power is supplied, the tag turns its mode of operation to a ready mode (Step S21). Then, it determines if it has received a command from the read/write device (Step S22). If it is determined that the tag has not received any command (Step S22, No), it repeats the processing operation of Step S22. If, on the other hand, it is determined that the tag has received a command (Step S22, Yes), the tag determines if it has received a group select command or not (Step S23).

If it is determined that the tag has received a group select command (Step S23, Yes), it turns its mode of operation to an ID mode (Step S24) and then returns to the ready mode. If, on the other hand, it is determined that the tag has not received a group select command (Step S23, No), the tag determines if its mode of operation is an ID mode or not (Step S25). If it is determined that the mode of operation is an ID mode (Step S25, Yes), the tag further determines if it has received a fail command or not (Step S26).

If it is determined that the tag has not received a fail command (Step S26, No), it determines if it has received a success command or not (Step S27). If it is determined that the tag has received a success command (Step S27, Yes), it updates the reading of the counter in the tag by decrementing the reading by −1 (Step S28) and determines if the reading of the counter in the tag is 0 or not (Step S29). If it is determined that the reading of the counter in the tag is 0 (Step S29, Yes), the tag transmits its own UID (unique ID) to the read/write device (Step S30).

If, on the other hand, it is determined that the tag has received a fail command (Step S26, Yes) as a result of the operation of determining if it has received a fail command or not (Step S26), it determines if the reading of the counter in the tag is 0 or not (Step S31) and, if it is determined that the reading of the counter in the tag is 0 (Step S31, Yes), the tag updates the reading of the counter by incrementing it by +1 (Step S32). If, on the other hand, it is determined in Step S31 that the reading of the counter in the tag is not 0 (Step S31, No), the tag generates a random number of 1 or 0 (Step S33) and determines if the generated random number is −0 or not (Step S34). If it is determined that the generated random number is −0 (Step S34, Y), the tag transmits its own UID to the read/write device (Step S35).

Thus, with an anti-collision process as described above, it is possible for the read/write device to acquire the UID of each tag, while preventing mutual interferences of a plurality of tags.

In order to prevent collisions, an anti-collision process as described above is conducted while restricting the transmission of tag UIDs for part of the tags and the process is repeated until the read/write device receives the UIDs of all the tags. Therefore, the processing operation proceeds fast when the number of tags is small because the probability of collisions is low. However, as the number tags increases, the number of times of repeating the process has to be raised in order to prevent collisions and hence the process is accompanied by a problem that a considerably long time is required before acquiring the UIDs of all the tag.

SUMMARY OF THE INVENTION

In view of the above identified problem hitherto known, it is therefore an object of the present invention to provide a wireless tag system that does not require any anti-collision process or, if an anti-collision process is required, can reduce the number of tags that need to participate in the anti-collision process to make the anti-collision process proceeds fast along with a wireless tag access control device, a wireless tag access control method, a wireless tag access control program and a tag that can be used for such a wireless tag system.

In an aspect of the present invention, the above object is achieved by providing a wireless tag system comprising: a plurality of wireless slave tags which have respective unique IDs; a plurality of wireless master tags arranged for the slave tags and storing the unique IDs of the slave tags; and a wireless tag access control device which accesses the master tags to acquire the unique IDs of the slave tags from the master tags and subsequently accessing the slave tags by using the acquired unique IDs of the slave tags.

Preferably, in a wireless tag system according to the present invention, dedicated commands are defined respectively for the master tags and the slave tags and the wireless tag access control device selectively accesses either the master tags or the slave tags by using the corresponding one of the dedicated commands.

Preferably, in a wireless tag system according to the present invention, group addresses are defined respectively for the master tags and the slave tags and the wireless tag access control device selectively accesses either the master tags or the slave tags by specifying the corresponding one of the group addresses.

Preferably, in a wireless tag system according to the present invention, a plurality of combinations of a master tag and slave tags are provided and at least a super master tag storing the unique IDs of the plurality of master tags is provided for the plurality of master tags, the wireless tag access control device being adapted to access the super master tag in order to acquire the unique IDs of the plurality of master tags and access the master tags by using the acquired unique IDs of the master tags.

Preferably, in a wireless tag system according to the present invention, at least one of the master tags and at least one of the slave tags are combined to operate as a single tag and the unique IDs of the slave tags stored in the master tags include its own unique Ids.

Preferably, in a wireless tag system according to the present invention, the master tag is facsimiled in numbers and the facsimiled master tags are identifiable.

Preferably, in a wireless tag system according to the present invention, the master tags store positional information of the slave tags in correspondence to the unique IDs of the slave tags stored in the master tags.

In another aspect of the present invention, there is provided a wireless tag access control device which accesses wireless tags comprising: a unique ID acquiring section which accesses at least a master tag provided for a plurality of slave tags and acquiring the unique IDs of the slave tags stored in the master tag; and a slave tag accessing section which accesses the slave tags by using the unique IDs of the slave tags acquired by the unique ID acquiring section.

Preferably, in a wireless tag access control device according to the present invention, dedicated commands are defined respectively for the master tags and the slave tags so that accesses either the master tags or the slave tags are selectively accessed by using the corresponding one of the dedicated commands.

Preferably, in a wireless tag access control device according to the present invention, group addresses are defined respectively for the master tags and the slave tags so that either the master tags or the slave tags are selectively accessed by specifying the corresponding one of the group addresses.

Preferably, a wireless tag access control device according to the present invention further comprises a positional information acquiring section for acquires positional information of the slave tags corresponding to the acquired unique IDs of the slave tags, the device being adapted to access the slave tags according to the unique IDs and the positional information.

In still another aspect of the present invention, there is provided a wireless tag access control method which accesses a plurality of wireless tags, the method being adapted to provide at least a master tag storing the unique IDs of a plurality of slave tags which have respective unique IDs, the method comprising: a slave tag UID acquiring step which accesses the master tag and acquiring the unique IDs of the plurality of slave tags stored in the master tag; and a slave tag accessing step which accesses the slave tags by using the acquired unique IDs of the slave tags.

Preferably, in a wireless tag access control method according to the present invention, dedicated commands are defined respectively for the master tags and the slave tags so that either the master tags or the slave tags are selectively accessed by using the corresponding one of the dedicated commands.

Preferably, in a wireless tag access control method according to the present invention, group addresses are defined respectively for the master tags and the slave tags so that either the master tags or the slave tags are selectively accessed by specifying the corresponding one of the group addresses.

Preferably, in a wireless tag access control method according to the present invention, a plurality of combinations of a master tag and slave tags are provided and at least a super master tag storing the unique IDs of the plurality of master tags is provided for the plurality of master tags, the wireless tag access control method being adapted to access the super master tag in order to acquire the unique IDs of the plurality of master tags and access the master tags by using the acquired unique IDs of the master tags.

Preferably, in a wireless tag access control method according to the present invention, at least a master tag is facsimiled in numbers from the master tags and slave tags and the facsimiled master tags are identifiable so that each tag is identified and selectively accessed.

Preferably, in a wireless tag access control method according to the present invention, an identifying section is provided for each tag to indicate the tag to be in use or not in use so that, when an unusable state is detected for at least one of the facsimiled master tags, the information stored in the master tag detected as unusable and the other facsimiled master tags is written in the facsimiled master tags not in use and the tags in which the information is written are indicated to be in use by the identifying section so as to make the other master tags and the master tag facsimiled master tags.

In still another aspect of the present invention, there is provided a wireless tag access control program which causes a computer to execute a wireless tag access control method which accesses a plurality of wireless tags, the program being adapted to provide at least a master tag storing the unique IDs of a plurality of slave tags which have respective unique IDs, the program comprising: a slave tag UID acquiring step which accesses the master tag and acquiring the unique IDs of the plurality of slave tags stored in the master tag; and a slave tag accessing step which accesses the slave tags by using the acquired unique IDs of the slave tags.

Preferably, in a wireless tag access control computer program according to the present invention, dedicated commands are defined respectively for the master tags and the slave tags so as to cause a computer to selectively access either the master tags or the slave tags by using the corresponding one of the dedicated commands.

In still another aspect of the present invention, there is provided a wireless tag comprising a wireless antenna and a memory section and adapted to be accessed by a read/write device by means of a wireless signal; the wireless tag storing unique IDs of wireless tags other than itself in the memory section so that they may be accessed by the read/write device by means of the unique IDs.

Thus, the invention provides an advantage that no anti-collision process is required or, if an anti-collision process is required, the number of tags that need to participate in the anti-collision process can be remarkably reduced to make the anti-collision process proceeds fast. This advantage becomes even more remarkable particularly in a situation where a large number of slave tags, or thousands to tens of thousands of slave tags, have to be processed because it is not necessary for a read/write device to collectively store the UIDs of such large number of slave tags.

DETAILED DESCRIPTION OF THE PREFERRED EMBODIMENTS

Now, the present invention will be described in greater detail by referring to the accompanying drawings that illustrate preferred embodiments of the invention.

[First Embodiment]

Figure 1:
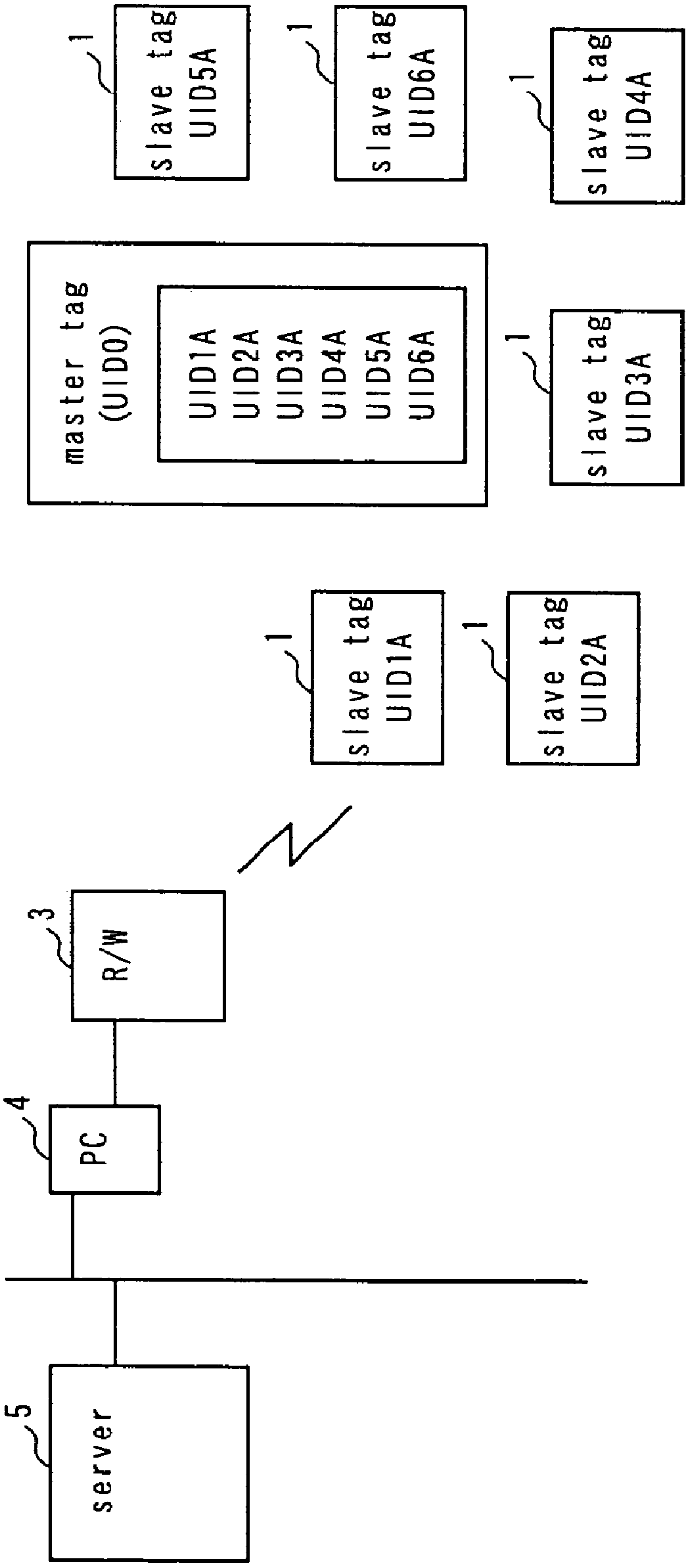
FIG. 1 is a schematic block diagram of a first embodiment of wireless tag system according to the invention, illustrating the overall configuration thereof.

FIG. 1 is a schematic block diagram of the first embodiment of wireless tag system according to the invention, illustrating the overall configuration thereof. Referring to FIG. 1, the wireless tag system comprises a plurality of slave tags 1, at least a master tag 2 arranged for the plurality of slave tags 1, a read/write device (R/W) 3 adapted to access the master tag 2 and the slave tags 1 and communicate with any of them, a PC 4 that controls the read/write device 3 and a server 5 connected to the PC 4 and adapted to provide the PC 4 with necessary information.

The plurality of slave tags 1 respectively have their own UIDs (UID1A through UID6A). The master tag 2 stores the UIDs (UID1A through UID6A) of the slave tags 1 and is adapted to transmit the UIDs of all the slave tags 1 in response to a request from the read/write device 3. The read/write device 3 can receive the transmitted UIDs and transfer them to the PC 4. The master tag 2 can delete or replace any of the stored UIDs and add one or more than one new UID in response to a request from the read/write device 3.

Each of the slave tags 1 stores predetermined management information on the objects of management (e.g., wears, books, building components, packages) (not shown) so as to be readable/writable to the read/write device 3 in addition to its own UID. Preferably, the slave tags 1 are arranged within the communicable area of the read/write device 3 with the master tag 2 and attached respectively to objects of management, for example.

The PC 4, the read/write device 3 or the PC 4 and the read/write device 3 in combination operate as a wireless tag access control device according to the invention that can access the wireless tags (slave tags 1, master tag 2). While a plurality of slave tags 1 are provided in this embodiment, the present invention is applicable to a a system that comprises a single slave tag 1.

Figure 2:
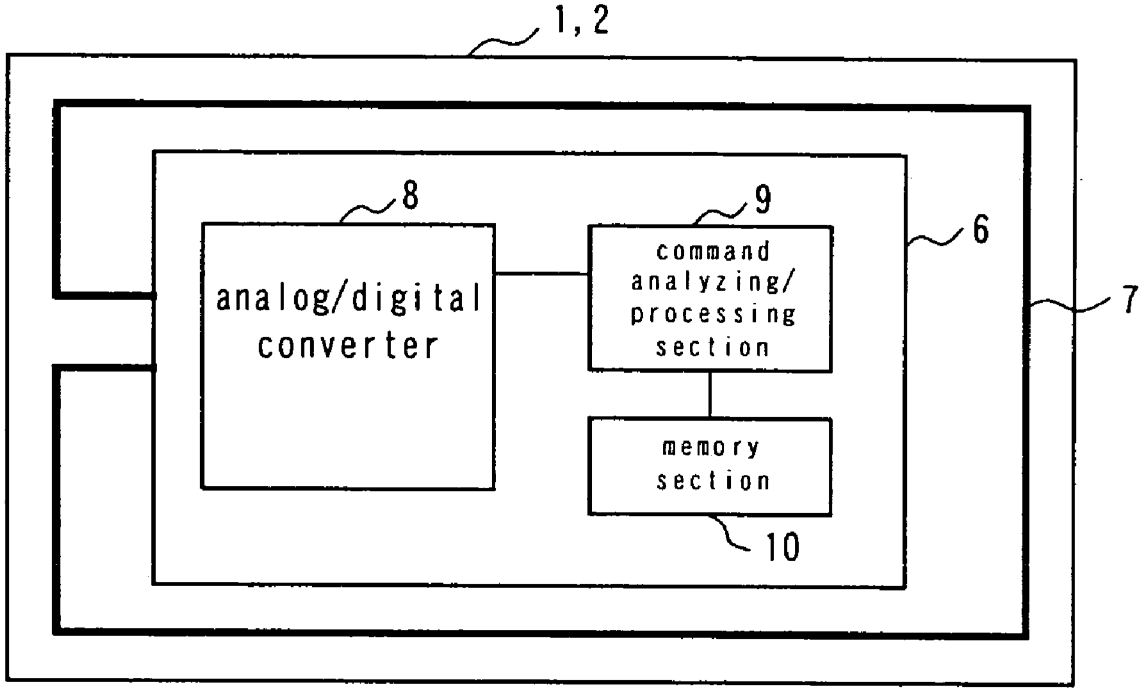
FIG. 2 is a schematic block diagram of a master tag and a slave tag, showing the configuration thereof.

FIG. 2 is a schematic block diagram of a master tag and a slave tag, showing the configuration thereof.

Each of the tags 1, 2 comprises a tag chip (IC chip) 6 and a loop antenna 7. The tag chip 6 in turn comprises an analog/digital converter 8 for converting an analog signal such as a radio signal, into a digital signal for internal processing, a command analyzing/processing section 9 for analyzing a command and carrying out a predetermined processing operation and a memory section 10. In the master tag 2, the memory section 10 stores the UID of the tag, the above described UIDs (UID1A through UID6A) of the slave tags 1 and other necessary pieces of information. The slave tag 1 stores predetermined management information in addition to its own UID. The memory section 10 also stores address information on the each of the tags.

Figure 3:
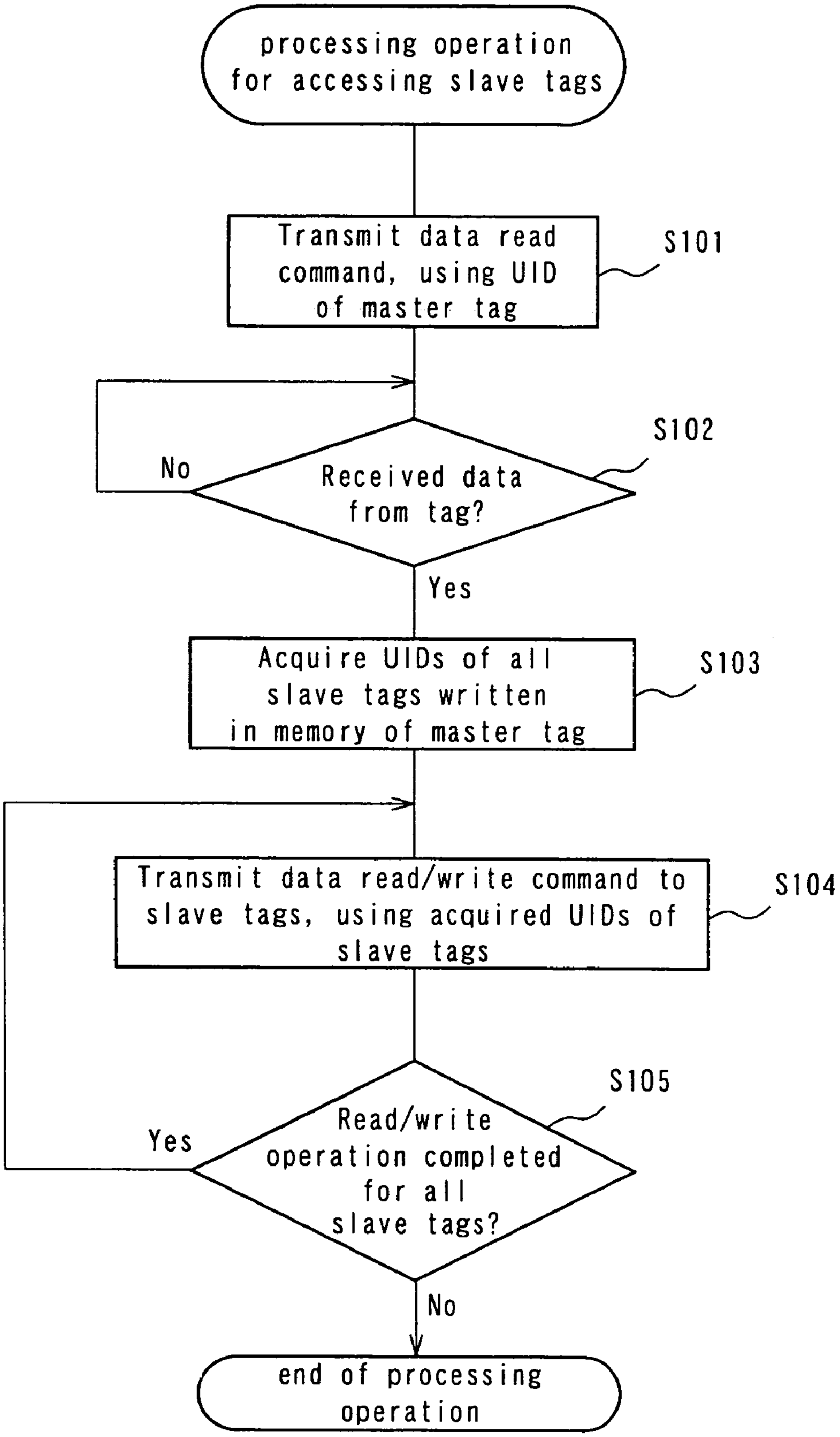
FIG. 3 is a flow chart of the operation of the first embodiment.

Now, the operation of the first embodiment will be described by referring to the flow chart of FIG. 3 in terms of the processing operation that is carried out by the tag access control device (the read/write device and the PC) to access the slave tags 1.

Firstly, the tag access control device transmits a data read command to the master tag 2, using the UID of the master tag 2 (Step S101). After receiving data from the master tag 2 (Step S102, Yes), it acquires the UIDs of all the slave tags 1 stored in the memory section 10 of the master tag 2 (Step S103). Then, it transmits a data read/write command to the slave tags 1, using the acquired UIDs of the slave tags 1, (Step S104). When the read/write operation relating to all the slave tags 1 is completed (Step S105, No), it ends the processing operation.

Thus, with the above-described first embodiment, it is possible to acquire the UIDs of the slave tags without carrying out an anti-collision processing operation relative to the slave tags by acquiring the UIDs of the slave tags from the master tag 2 and accesses the slave tags 1 to remarkably improve the efficiency of the management. Note that, in a wireless tag access control device according to the invention, a UID acquiring section is responsible for Step S101 through Step S103, whereas a slave tag accessing section is responsible for Step S104.

When a single master tag 2 is provided, it is accessed by using its own UID. If there are a plurality of master tags 2, either an anti-collision processing operation is carried out or a group address is used as will be described hereinafter. However, according to the invention, it is possible to dramatically reduce the number of necessary tags if compared with an arrangement where an anti-collision processing operation needs to be carried out for all the slave tags. Therefore, it may be clear that the present invention can carry out the anti-collision processing operation remarkably quickly.

[Second Embodiment]

In the second embodiment, dedicated commands are provided in order to discriminate the access to the master tag and the access to the slave tags.

Figure 4:
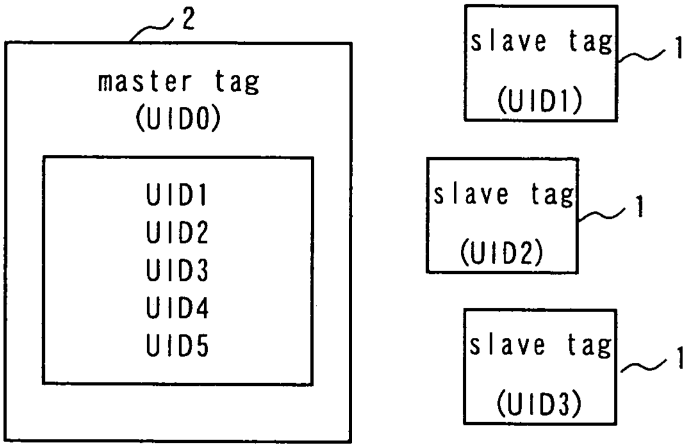
FIG. 4 is a conceptual illustration of a second embodiment.
Figure 4:
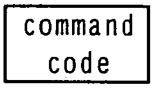

FIG. 4 is a conceptual illustration of the second embodiment. In FIG. 4, (a) shows a situation where a single master tag 2 and a plurality of slave tags 1 exist. It is necessary to firstly access the master tag 2 in order to acquire the UIDs of the slave tags stored in the master tag 2. The master tag 2 can be accessed efficiently by separately preparing an access command which accesses the master tag 2 and an access command which accesses the slave tags. This arrangement provides an additional managemental advantage that, when the slave tags need to be accessed, they can be accessed without involving the master tag.

In FIG. 4, (b) shows an example of command format. With this format, the master tag 2 is selected when the command code is "0x00" so that all the subsequent commands are regarded as those solely for the master tag 2. On the other hand, the slave tags 1 are selected when the command code is "0x01" so that all the subsequent commands are regarded as those solely for the slave tags 1.

Figure 5:
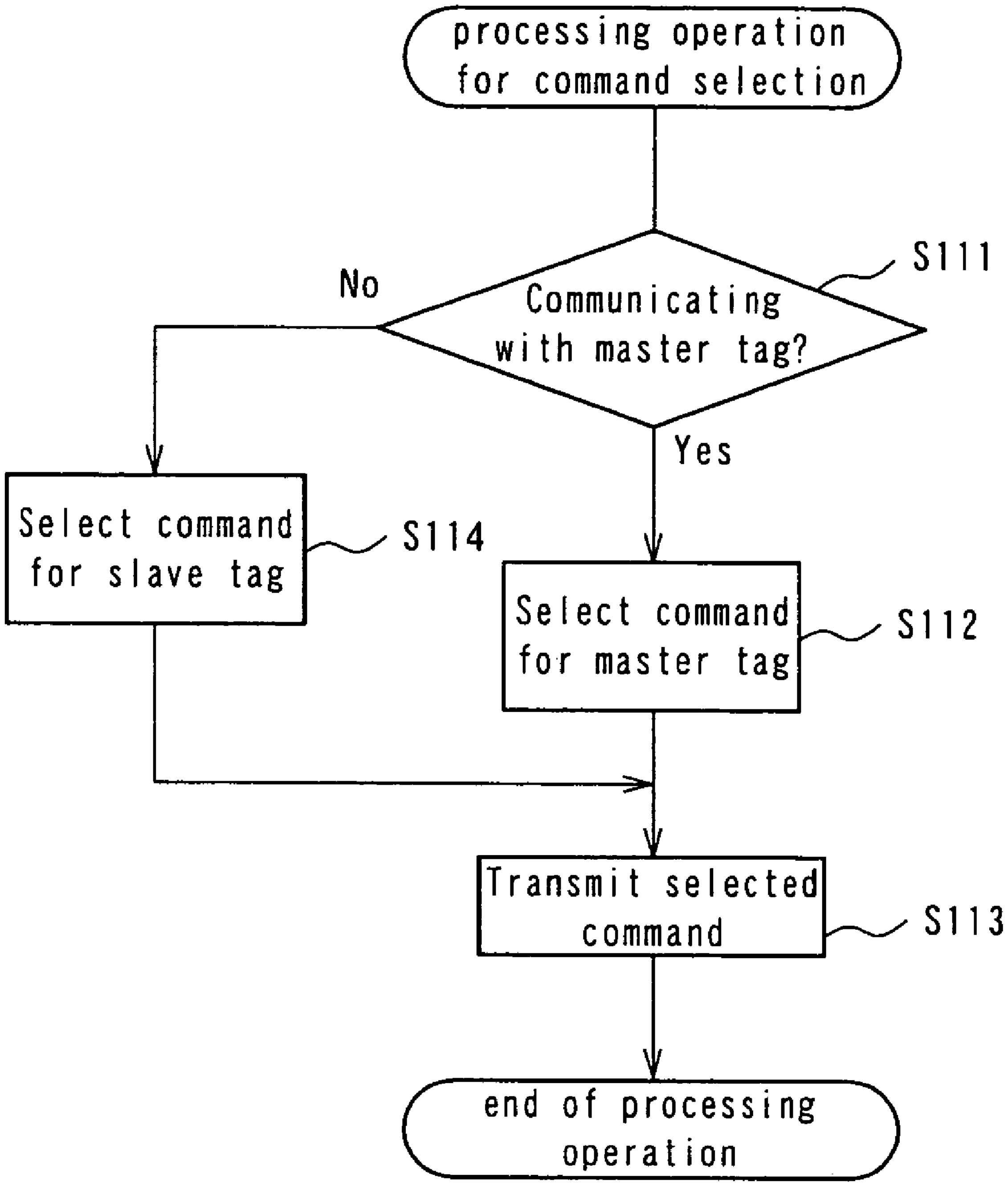
FIG. 5 is a flow chart of the operation of the second embodiment.

Referring to FIG. 5 illustrating a flow chart of the operation of the second embodiment, as a processing operation for selecting a command is started, it is determined if the coming communication is to be held with the master tag or not (Step S111). If the coming communication is to be held with the master tag (Step S111, Yes), the command for the master tag is selected (Step S112) and the selected command is transmitted (Step S113). If, on the other hand, the coming communication is to be held not with the master tag but with the slave tags (Step S111, No), the command for the slave tags is selected (Step S114) and the selected command is transmitted (Step S113).

[Third Embodiment]

In the third embodiment, group addresses are provided so as to be able to identify the master tag and the slave tags which are accessed.

Figure 6:
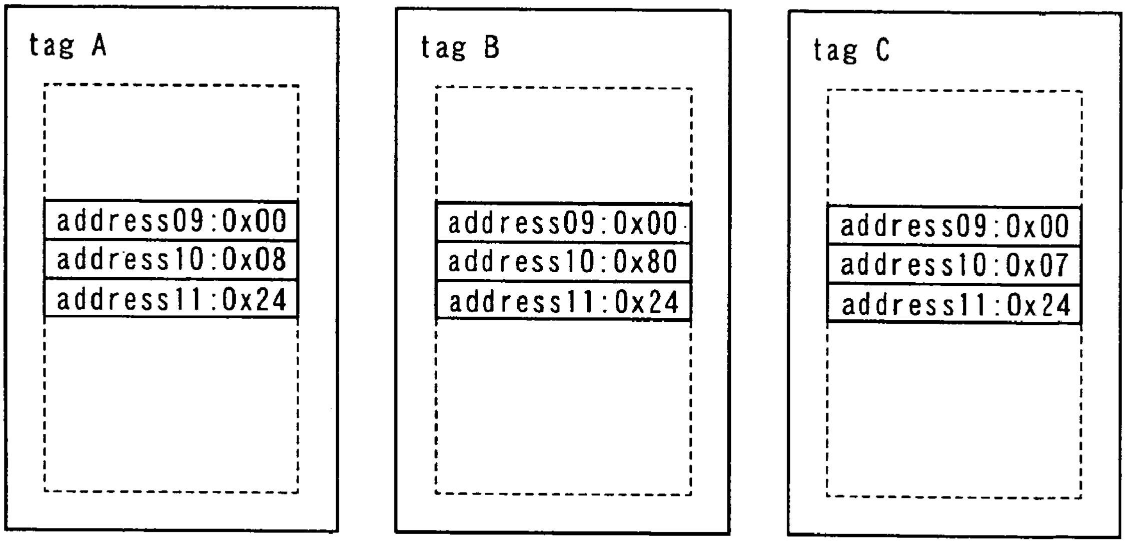
FIG. 6 is a conceptual illustration of a third embodiment.

FIG. 6 is a conceptual illustration of the third embodiment. FIG. 6(*a*) shows an example of command format. If the command code is "0x00" and the group address is "10" while the data is "0x80", it is clearly seen from (b) of FIG. 6 that the data "0x80 " stored at address "10" is carried by tag B. Thus, it is possible to tell if a given command is for the master tag or for the slave tags by using group addresses as described above to a great advantage of improving the efficiency of management.

Figure 7:
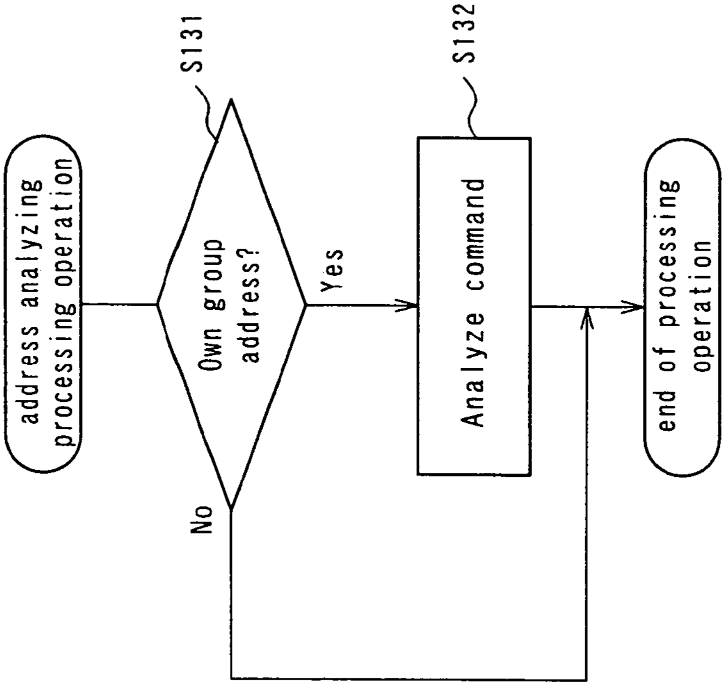
FIG. 7 is flow charts of the operation of the third embodiment.
Figure 7:
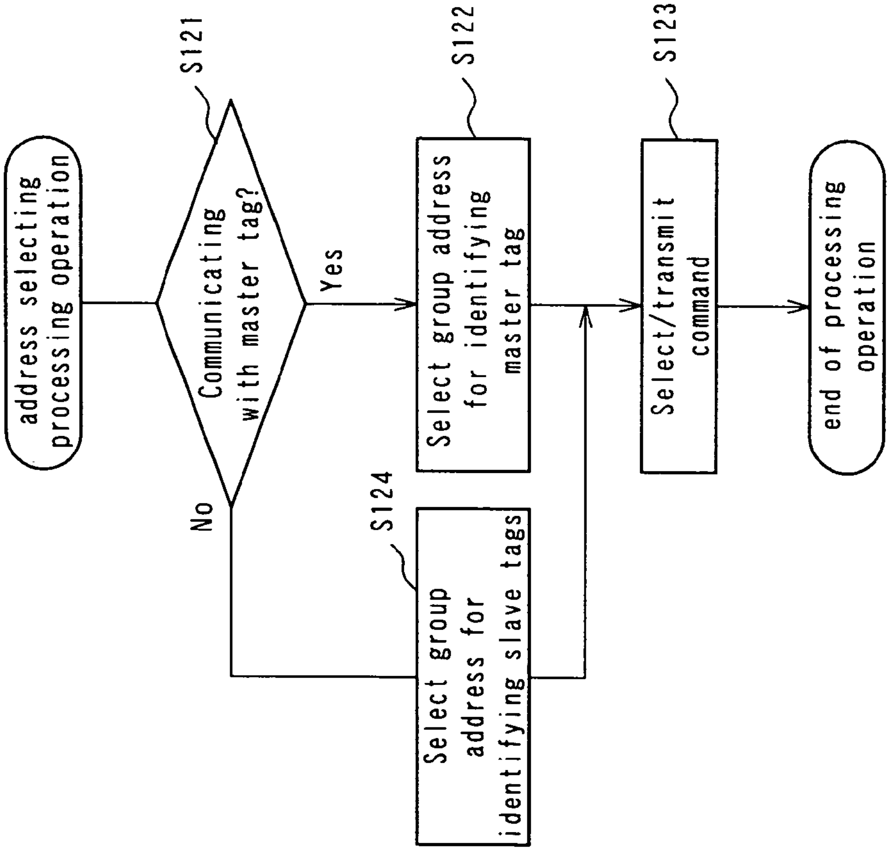

FIGS. 7(*a*) and 7(*b*) show flow charts of the operation of the third embodiment. FIG. 7(*a*) shows a flow chart for the access control device, whereas FIG. 7(*b*) shows a flow chart for the tags.

As shown in FIG. 7(*a*,) when a processing operation is started, the wireless tag access control device determines if the coming communication is for the master tag or not (Step S121). If it is determined that the coming communication is for the master tag (Step S121, Yes), the wireless tag access control device selects the group address for identifying the master tag (Step S122) and then selects and transmits the command (Step S123). If, on the other hand, it is determined that the coming communication is not for the master tag (Step S121, No), the wireless tag access control device selects the group address for identifying the slave tags (Step S124) and proceeds to Step S123.

Now, referring to FIG. 7(*b*) showing a flow chart for the tags, firstly it is determined if the group address is for its own group or not (Step S131). If it is determined that the group address is for its own group (Step S131, Yes), the tag or each of the tags analyzes the command and carries out a corresponding processing operation (Step S132). If, on the other hand, it is determined that the group address is not for its own group (Step S131, No), it simply terminates the operation.

[Fourth Embodiment]

The fourth embodiment is adapted to an arrangement where there are more than one group of a master tag and slave tags. In the fourth embodiment, a dedicated command is provided so that only the master tag of each group may participate in the anti-collision processing operation.

Figure 8:
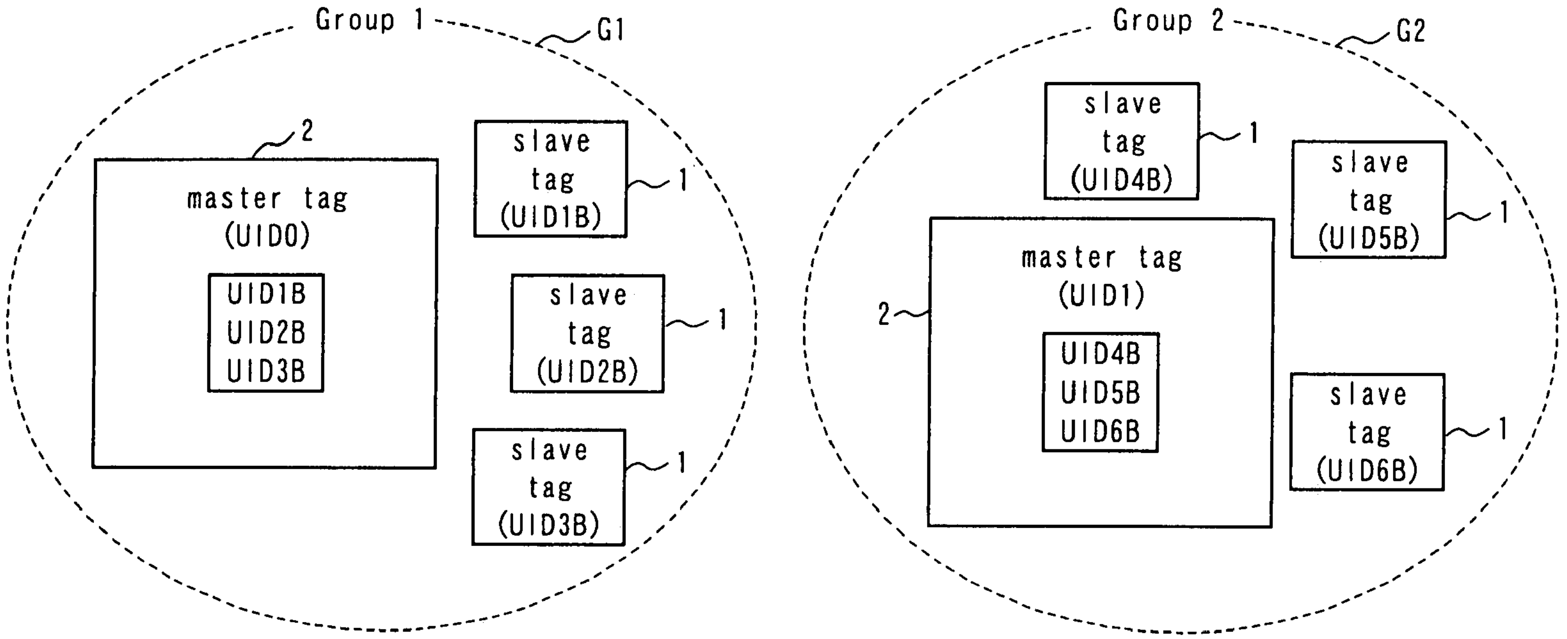
FIG. 8 is a conceptual illustration of a fourth embodiment.
Figure 8:

FIGS. 8(*a*) and 8(*b*) show a conceptual illustration of a fourth embodiment. FIG. 8(*a*) shows that there are more than one group (two in the illustrated instance), or groups G1, G2, of a master tag and slave tags. In this case, it is necessary to firstly carry out an anti-collision processing operation for the master tags 2 in order to acquire the UIDs of the master tags for the purpose of acquiring the UIDs of the slave tags. When carrying out the anti-collision processing operation, the UIDs of the master tags can be acquired with ease if it is possible to discriminate the tags (master tags) that need to participate in the anti-collision processing operation from the slave tags. Therefore, it is desirable to provide a command which causes only the master tags to participate in the anti-collision processing operation.

FIG. 8(*b*) shows an example of a command format. Only the master tags are put into a mode for participating in the anti-collision processing operation when the command is “0x00”. On the other hand, only the slave tags are put into a mode for participating in the anti-collision processing operation when the command is “0x01”.

Figures 9, 10:
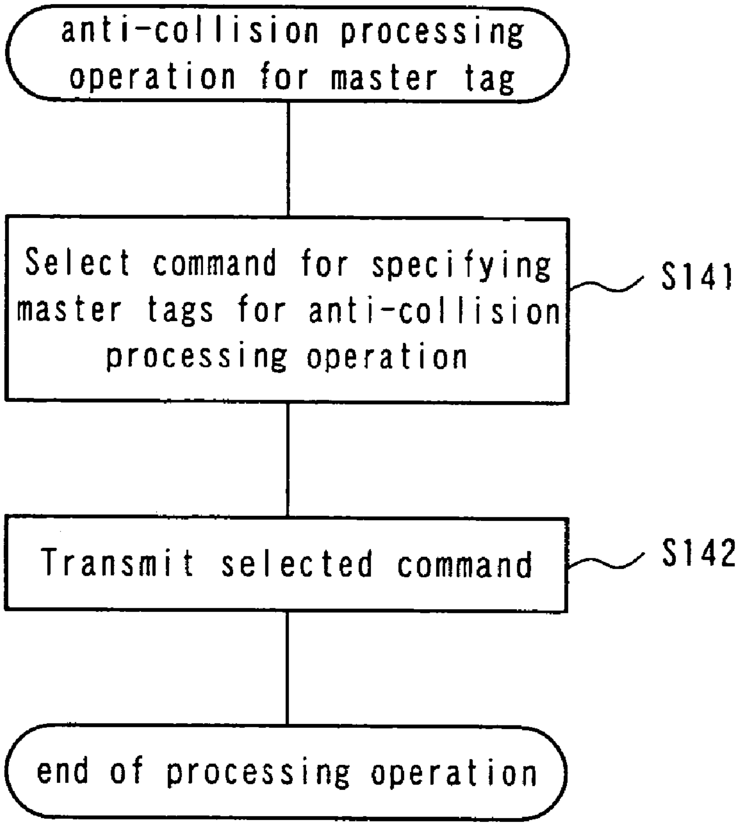
FIG. 9 is a flow chart of the operation of the fourth embodiment.
FIG. 10 is an illustration of the command format of a fifth embodiment.

FIG. 9 is a flow chart of the operation of the fourth embodiment. Firstly, because the anti-collision processing operation is started only for the master tags, the command for specifying the master tags for the anti-collision processing operation is selected (Step S141) and the selected command is transmitted (Step S142) to end the processing operation.

[Fifth Embodiment]

The fifth embodiment corresponds to the third embodiment in the sense that, where there are a plurality of groups of a master tag and slave tags, a group address is used to specify the master tag of a groups as shown in (a) of FIG. 8.

FIG. 10 is an illustration of the command format of the fifth embodiment. Referring to FIG. 10, if the command code, the group address and the data for the group are respectively “0x00”, “10” and “0x80”, only the tag whose group address and data are respectively “10” and “0x80” can be selected as master tag. In the wireless tag access control device, as the processing operation of the step of specifying the master tag is carried, that of the step of selecting the group address of the master tag and that of the step of transmitting the command which have the group address are carried out sequentially.

[Sixth Embodiment]

The sixth embodiment is adapted to accommodate a situation where there are a plurality of master tags as in the case of a plurality of groups of a master tag and slave tags by providing a super master tag that stores the UIDs of the master tags.

Figure 11:
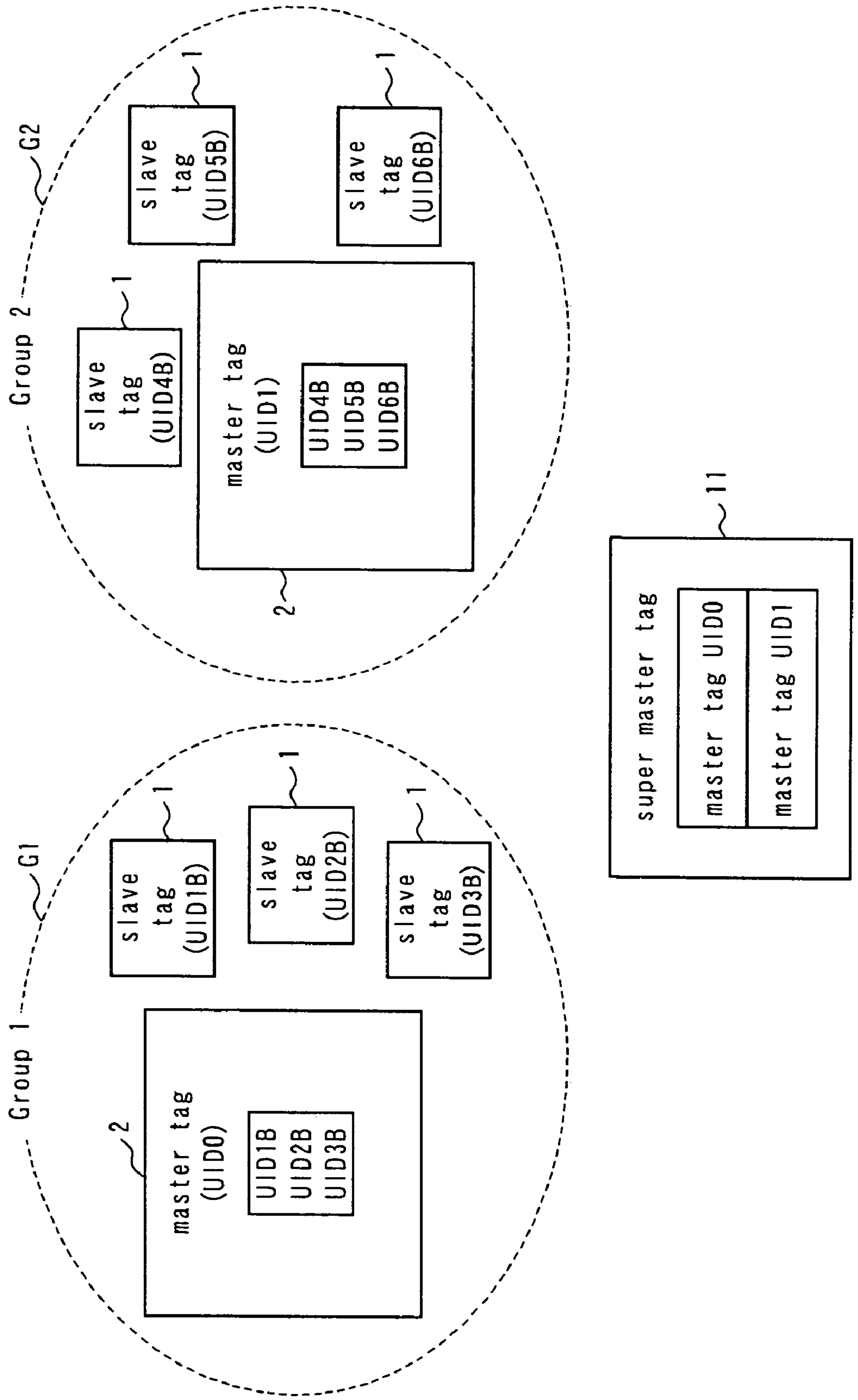
FIG. 11 is a conceptual illustration of a sixth embodiment.
Figure 12:
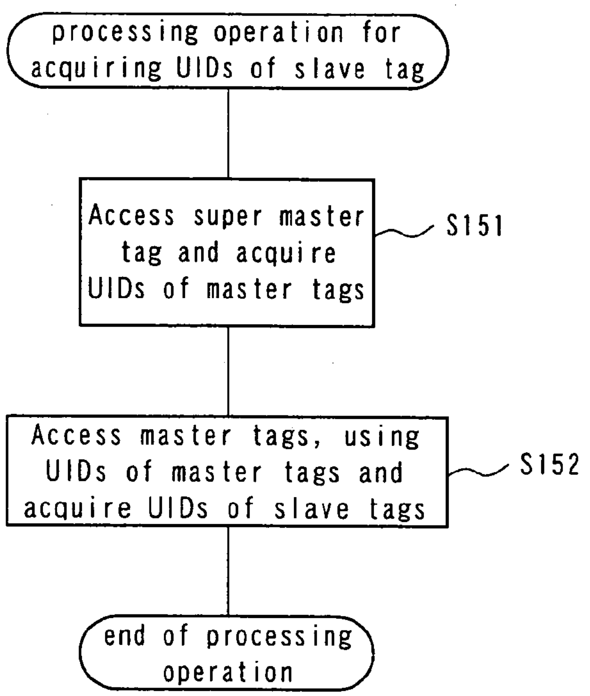
FIG. 12 is a flow chart of the operation of the sixth embodiment.

Assume that there are groups G1, G2 of a master tag and slave tags as shown in FIG. 11. Then, a super master tag 11 is provided to store the UIDs of the master tags 2. Then, referring to FIG. 12, the wireless tag access control device firstly accesses the super master tag 11 and acquires the UIDs (UID(0), UID(1)) of the plurality of master tags 2 (Step S151) and subsequently accesses the master tags by using the acquired UIDs of the master tags to acquire the UIDs of the slave tags stored in each master tag (Step S152).

Thus, with the sixth embodiment, it is not necessary to carry out an anti-collision processing operation if there are a plurality of master tags so that the processing operation proceeds fast to a great advantage of management.

[Seventh Embodiment]

In the seventh embodiment, one of the slave tags is used as master tag. In other words, one of the slave tags operates both as master tag and slave tag.

Figure 13:
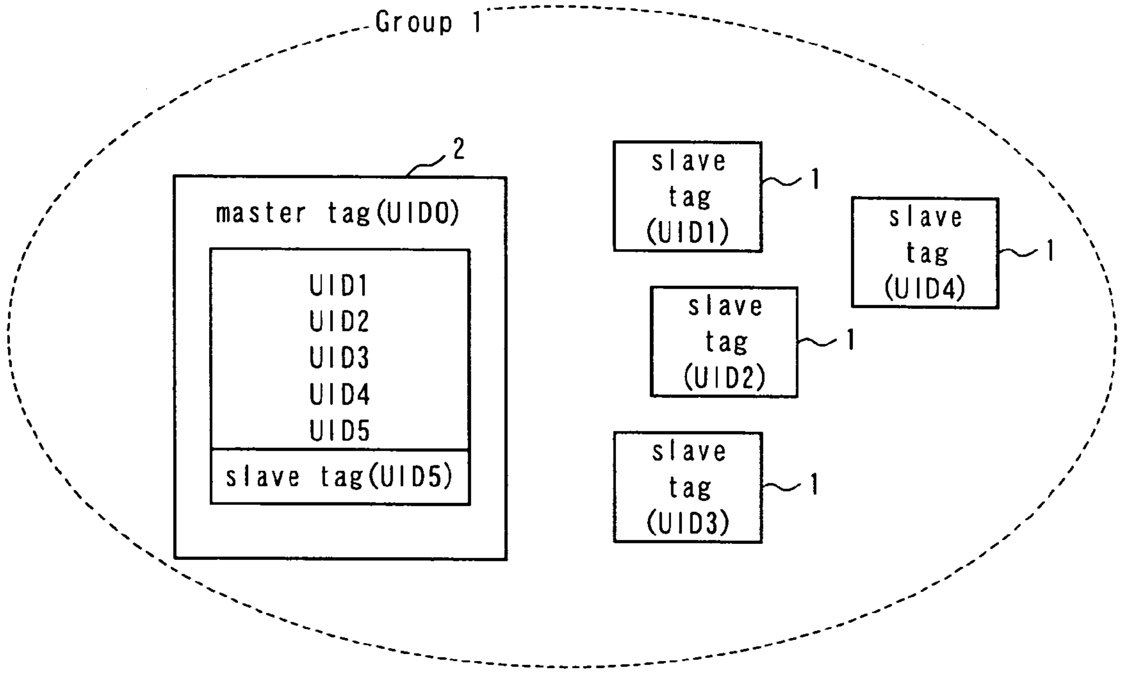
FIG. 13 is a conceptual illustration of a seventh embodiment.

FIG. 13 is a conceptual illustration of the seventh embodiment. Referring to FIG. 13, the master tag stores the UIDs of a plurality of slave tags and one of the UIDs is the UID of the master tag. With this arrangement, the master tag registers its own UID both as that of a slave tag and as that of the master tag so that it can operate as slave tag.

[Eighth Embodiment]

In the eighth embodiment, the master tag is facsimiled in numbers (e.g., duplicated) to raise the reliability of the system.

Figure 14:
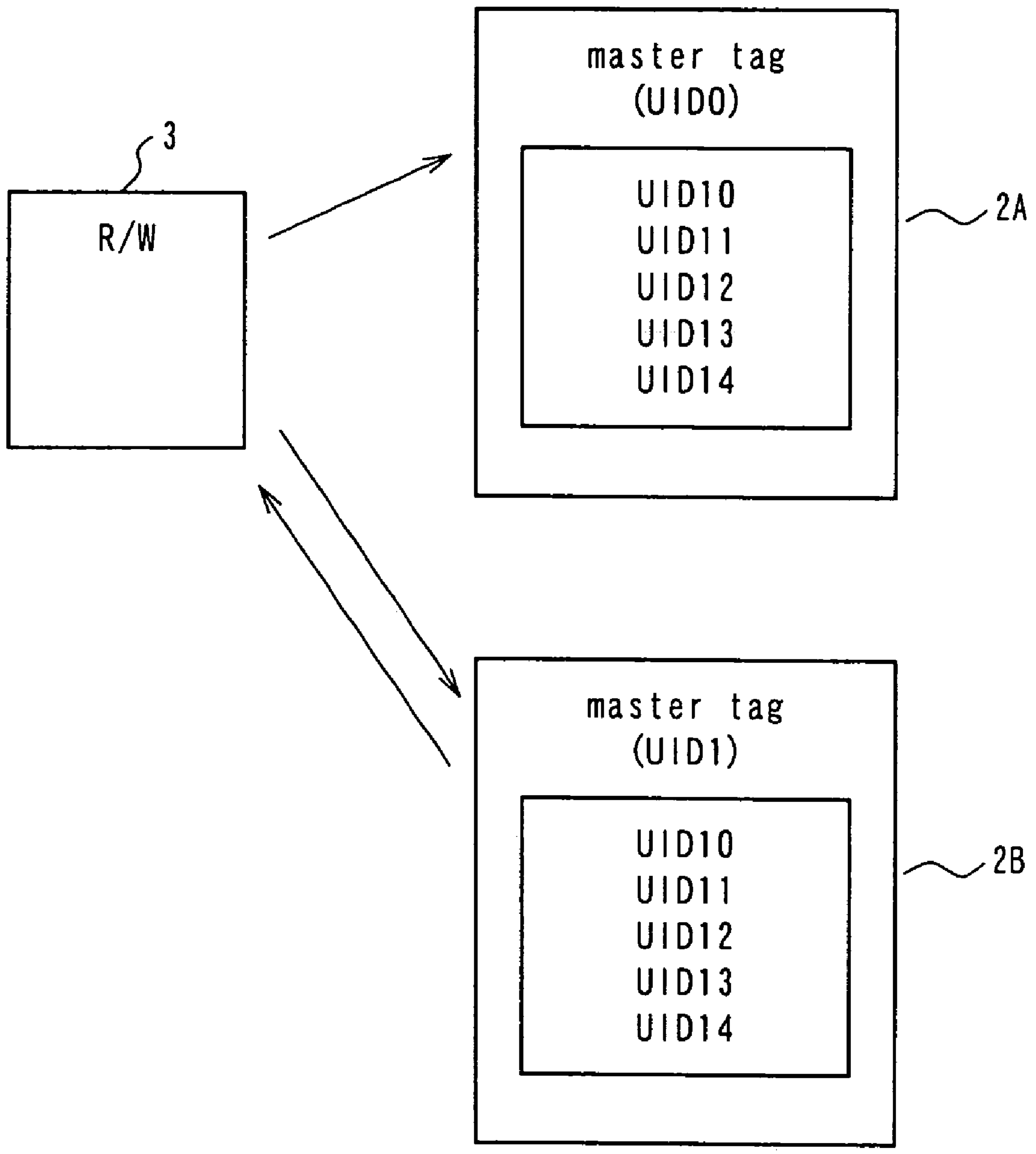
FIG. 14 is a conceptual illustration of an eighth embodiment.

FIG. 14 is a conceptual illustration of the eighth embodiment. Referring to FIG. 14, two master tags 2A, 2B that store the UIDs of the same slave tags are provided to control the UIDs of the slave tags. If the wireless tag access control device cannot read the UIDs of the slave tags from the master tag 2A, it reads the UIDs of the slave tags from the master tag 2B. With this arrangement, the system shows an enhanced degree of reliability because, if one of the master tags fails or shows some other trouble, the other master tag can provide the UIDs of the slave tags. It is also possible to facsimile the slave tags to further enhance the reliability of information management.

[Ninth Embodiment]

In the ninth embodiment, the master tag is facsimiled in numbers (e.g., duplicated) to raise the reliability of the system in terms of UID management of the slave tags as in the case of the eighth embodiment and, at the same time, the facsimiled master tags are made identifiable so that the system can be restored if it fails.

Figure 15:
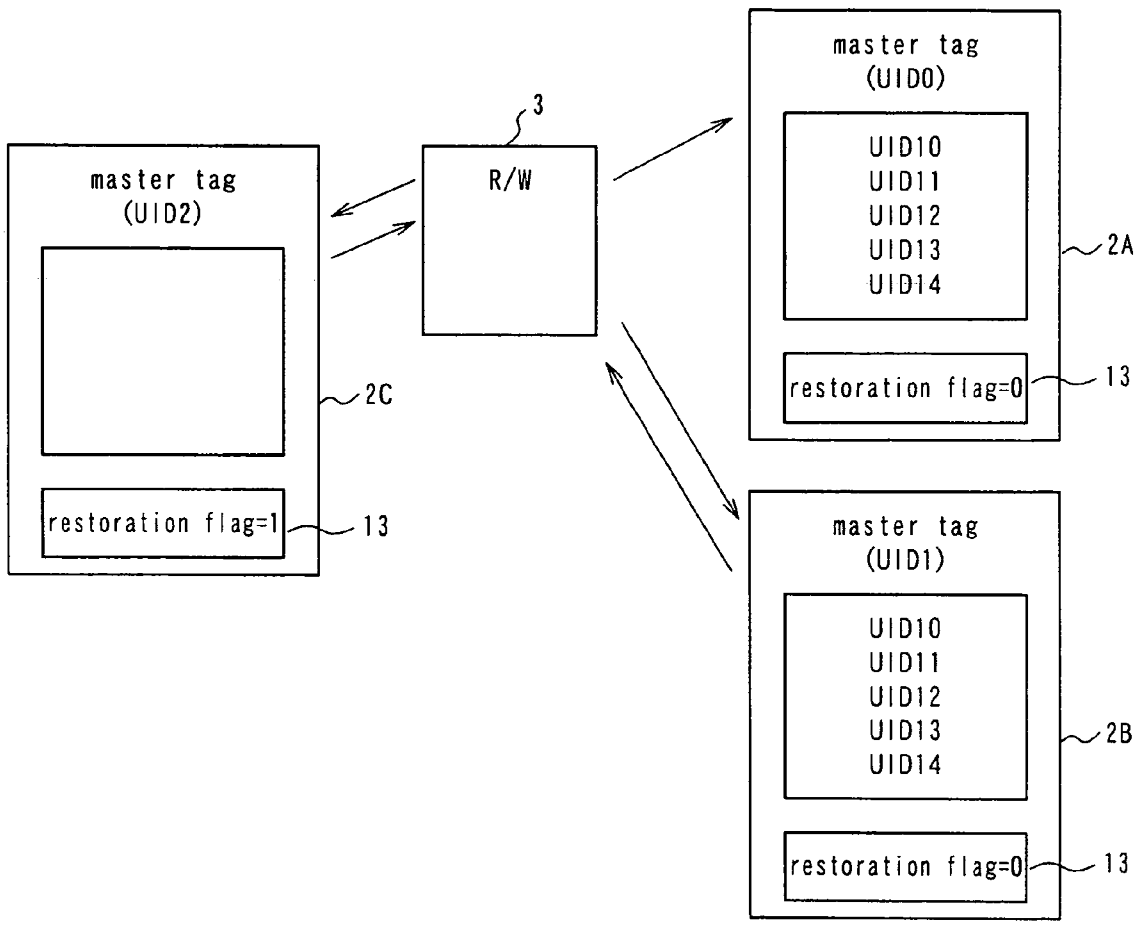
FIG. 15 is a conceptual illustration of a ninth embodiment.
Figure 16:
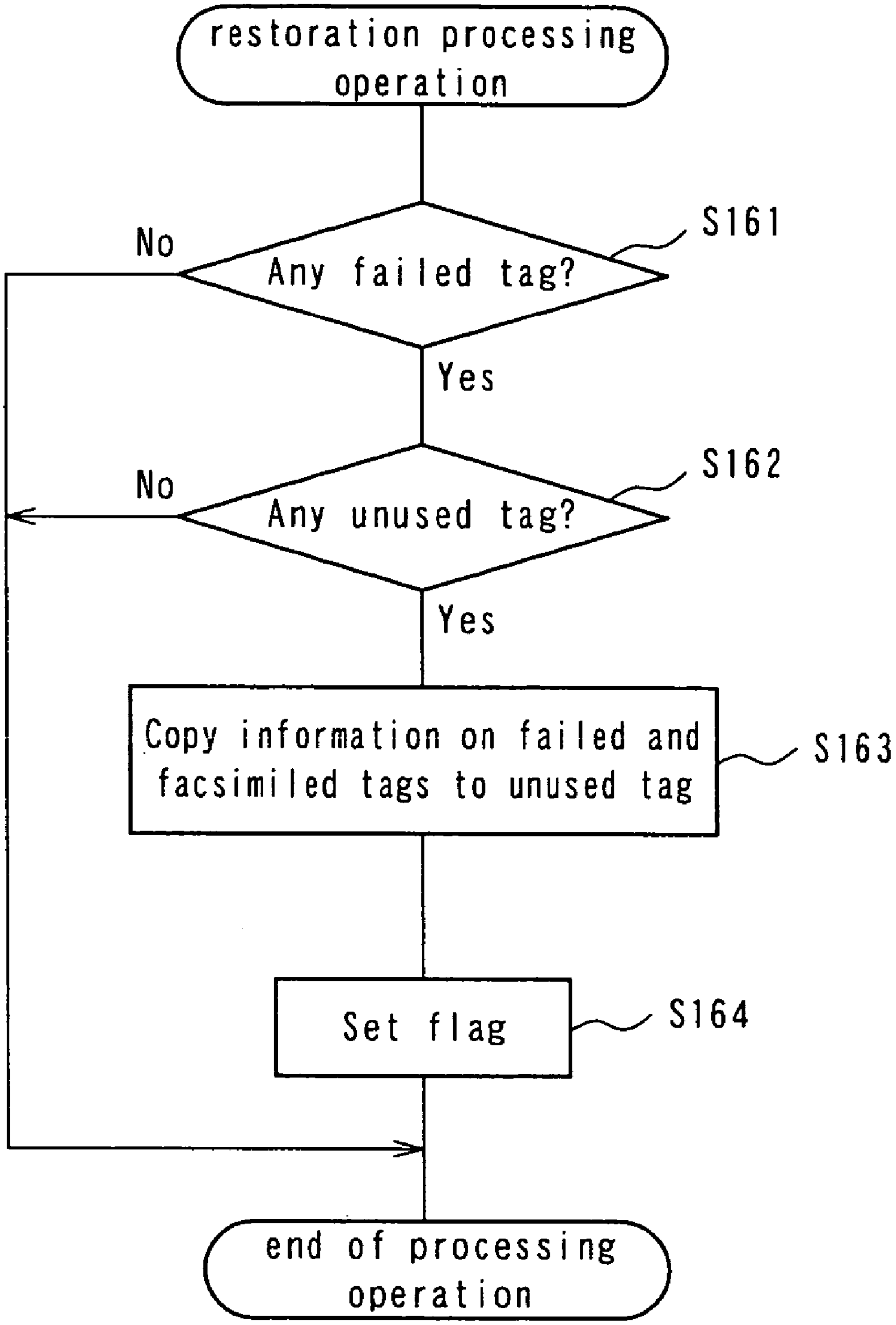
FIG. 16 is a flow chart of the operation of the ninth embodiment.

FIG. 15 is a conceptual illustration of the ninth embodiment. FIG. 16 is a flow chart of the operation of the ninth embodiment.

Referring to the drawings, each tag is provided with a restoration flag area (identifying section for identifying if the tag is in use or not in use) 13 and restoration flag “0” is written to each tag that is in use. Restoration flag “1” is written to each unused tag that is to be used for restoration. If one of the facsimiled master tags (tag 2A) fails (Step S161, Yes), an unused tag (tag 2C) is searched for by searching for the tag with restoration flag “1” out of the master tags in the communication area and, if an unused tag is found (Step S162, Yes), the data (the UIDs of the slave tags) of the master tag 2B that is the duplicate of the failed master tag are transferred (copied) to the tag 2C (Step S163) and the flag of the master tag is set to “1” (Step S164). Thereafter, the master tag 2B and the master tag 2C are used as facsimiled (duplicated) master tags.

[Tenth Embodiment]

In the tenth embodiment, positional information of the slave tags are stored in the master tag along with the UIDs of the slave tags.

Figure 17:
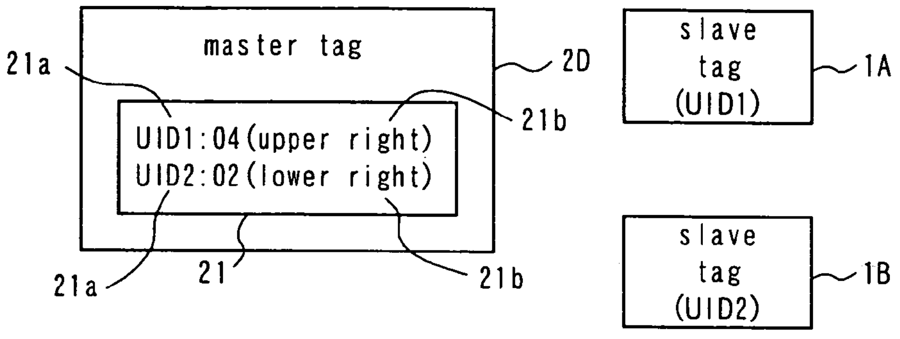
FIG. 17 is a conceptual illustration of a tenth embodiment.

FIG. 17 is a conceptual illustration of the tenth embodiment. Referring to FIG. 17, positional information of the slave tags 1A, 1B is stored in the master tag 2D so that, when the slave tags are applied to large product such as a building component (not shown), it is possible to access either of the tags and modify the information stored in the tag depending on the positions of the tags.

More specifically, as shown in FIG. 17, positional information 21*b* on the applied (bonded) position of each slave tag is added to the UID information 21*a* as slave tag information 21 that is stored in the master tag 2D. In the case of a large product such as a building component, it may be desired to write different pieces of information respectively to different parts of the products. For example, a lower part of the product is to be painted in a step of the building operation, the data on the time and date of the painting operation may have to be written to the tag applied to the lower part of the product. Then, it is possible to read the slave tag information 21 in the master tag 2D and write the necessary data (management information) only to the tag for the lower part of the product.

Figure 18:
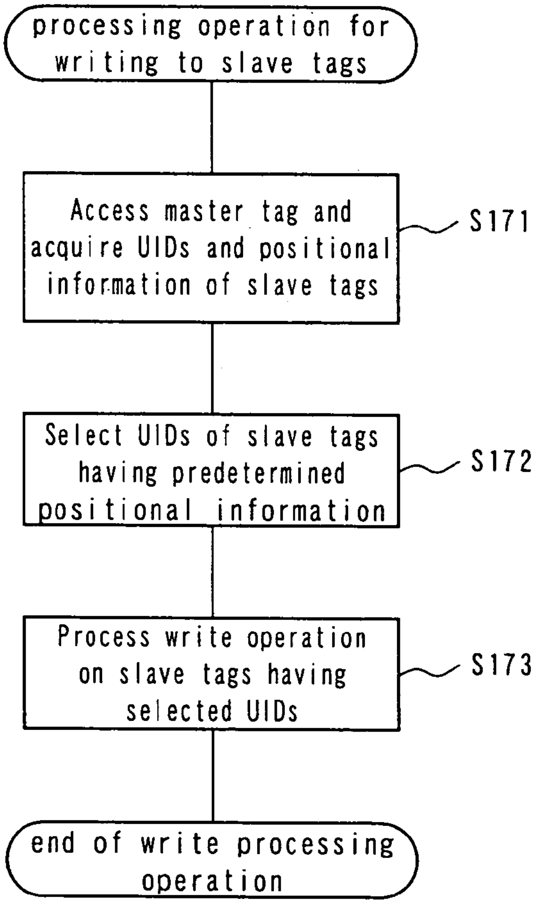
FIG. 18 is a flow chart of the operation of the tenth embodiment.

FIG. 18 is a flow chart of the operation of the tenth embodiment when writing information in a slave tag.

Referring to FIG. 18, firstly, the wireless tag access control device accesses the master tag 2D and acquires the UID21*a* and the positional information 21*b* of each of the slave tags 1A, 1B from the slave information 21 (Step S171). Then, it selects and acquires the UID of the slave tag that has the right positional information (Step S172). As it acquires the UID of the slave tag which have the right positional information, it accesses the slave tag, using the UID and operates for writing the necessary data (Step S173). Note that the positional information acquiring section is responsible for the operation of Step S171.

The present invention is described above by way of preferred embodiments. Now, the processing operation for updating the data (UIDs) of the slave tags registered in the master tag(s) will be described below. While the data updating processing operation will be described in terms of the first embodiment below, it is similarly applicable to the other embodiments including the second embodiment through tenth embodiment.

Figure 19:
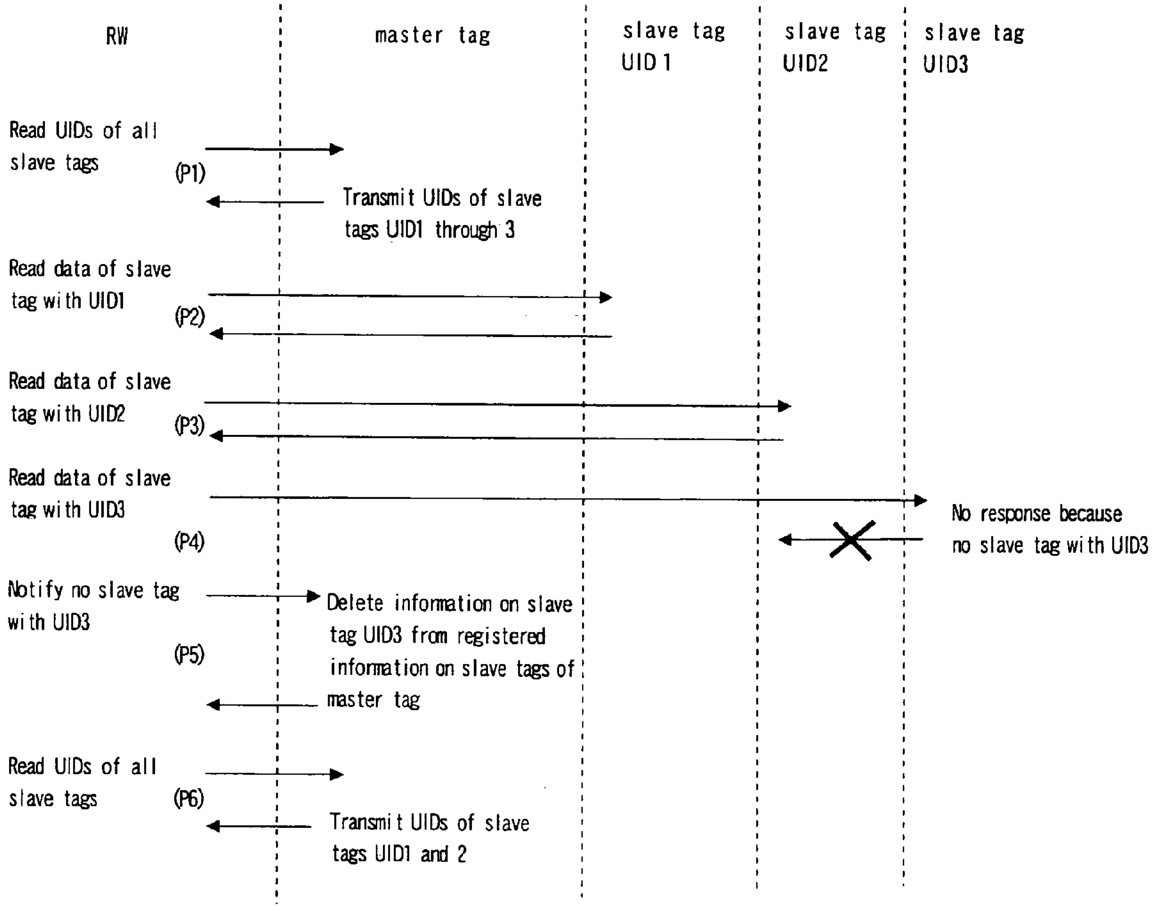
FIG. 19 is a conceptual illustration of the processing operation for updating the data on the slave tags registered in a master tag.

Referring to FIG. 19, the data updating processing operation may be repeated at regular time intervals (or at a predetermined clock time or predetermined clock times). The PC of the wireless tag access control device acquires the UIDs of the slave tags from the master tag by way of the read/write device (P1) and sequentially reads the data of the slave tags, using the UIDs (P2 through P4). If a slave tag (UID3 in the illustrated instance) goes out of control, no acknowledgement can be received from the slave tag with the UID (P4). Therefore, the PC decides that the slave tag has gone out of control of the PC (the commodity carrying the slave tag may have been moved to the outside) and issues an order to the master tag for erasing the UID. Upon receiving the order, the master tag deletes the UID of the slave tag (P5). Then, the processing operation described above for the preferred embodiments is carried out for the remaining slave tags (P6). Note that the relationship between the super master tag and the master tags in the sixth embodiment is similar to the above-described relationship between the master tag and the slave tags. So is the relationship between the master tag and the slave tags in the seventh embodiment where one of the slave tags is used as master tag. In the seventh embodiment, if it is judged that the slave tag that is operating as master tag has gone out of control, some other slave tag may be registered as master tag.

Figure 20:
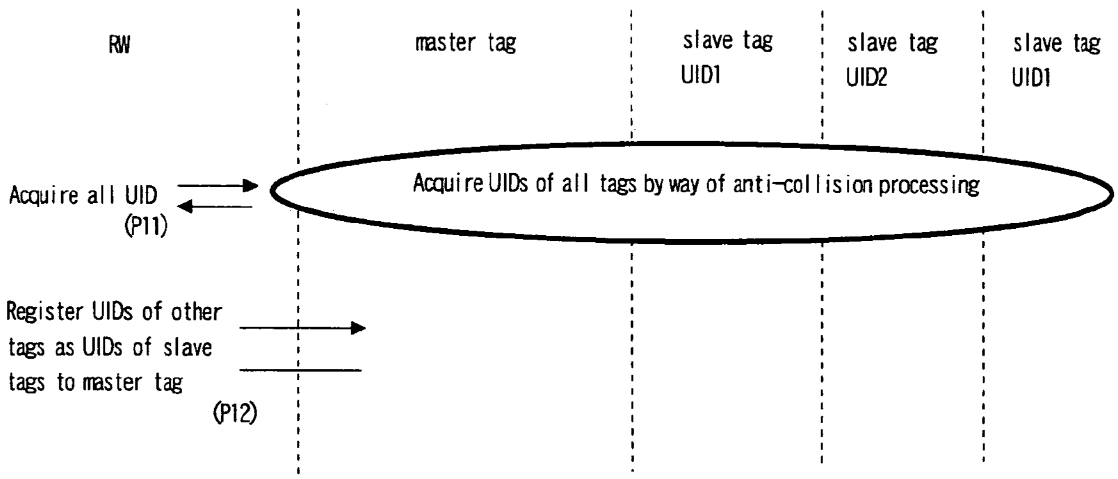
FIG. 20 is a conceptual illustration of the processing operation for initializing slave tags and master tags.
Figure 21:
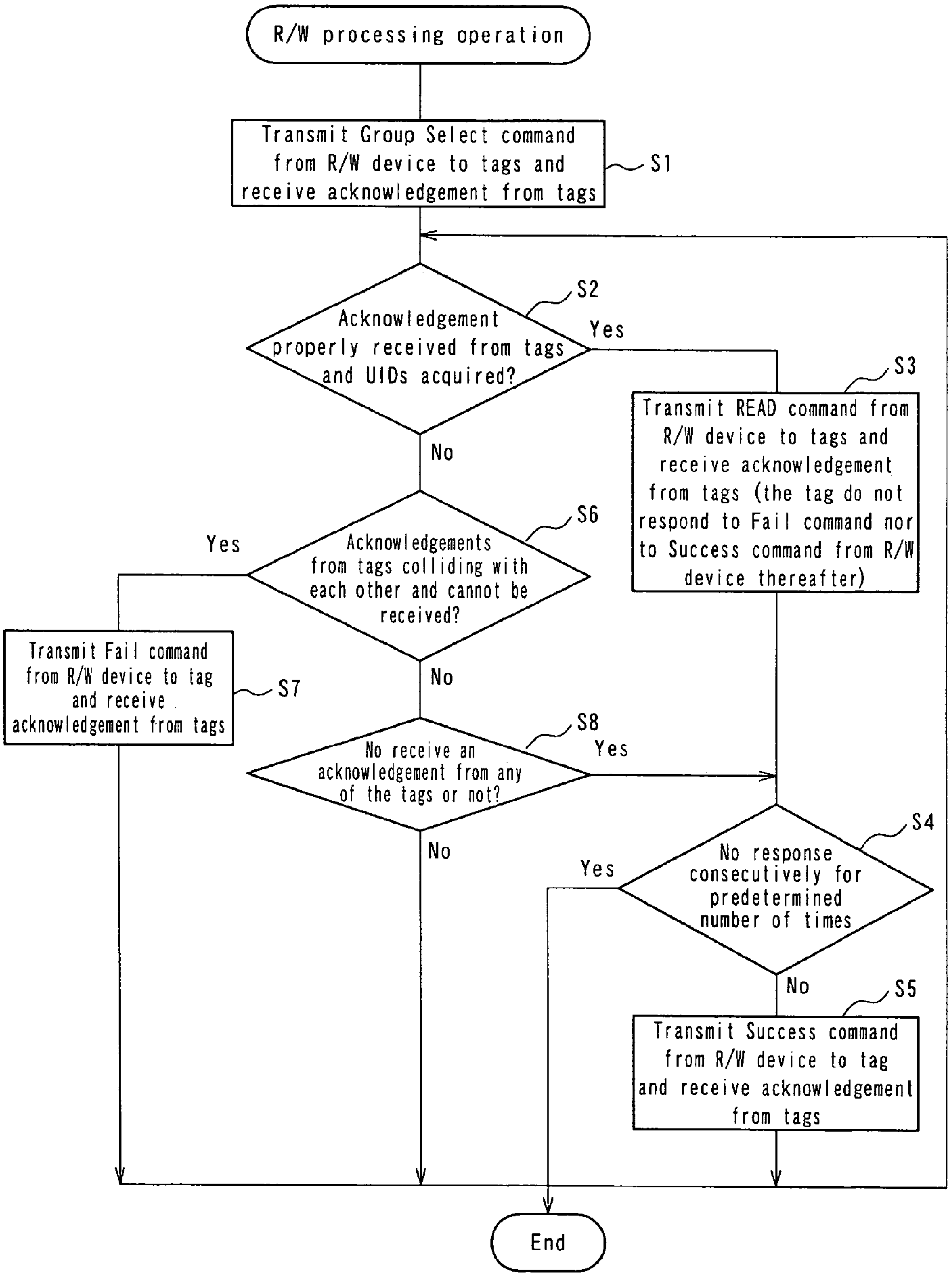
FIG. 21 is a flow chart of the operation of a read/write device in a conventional anti-collision process.
Figure 22:
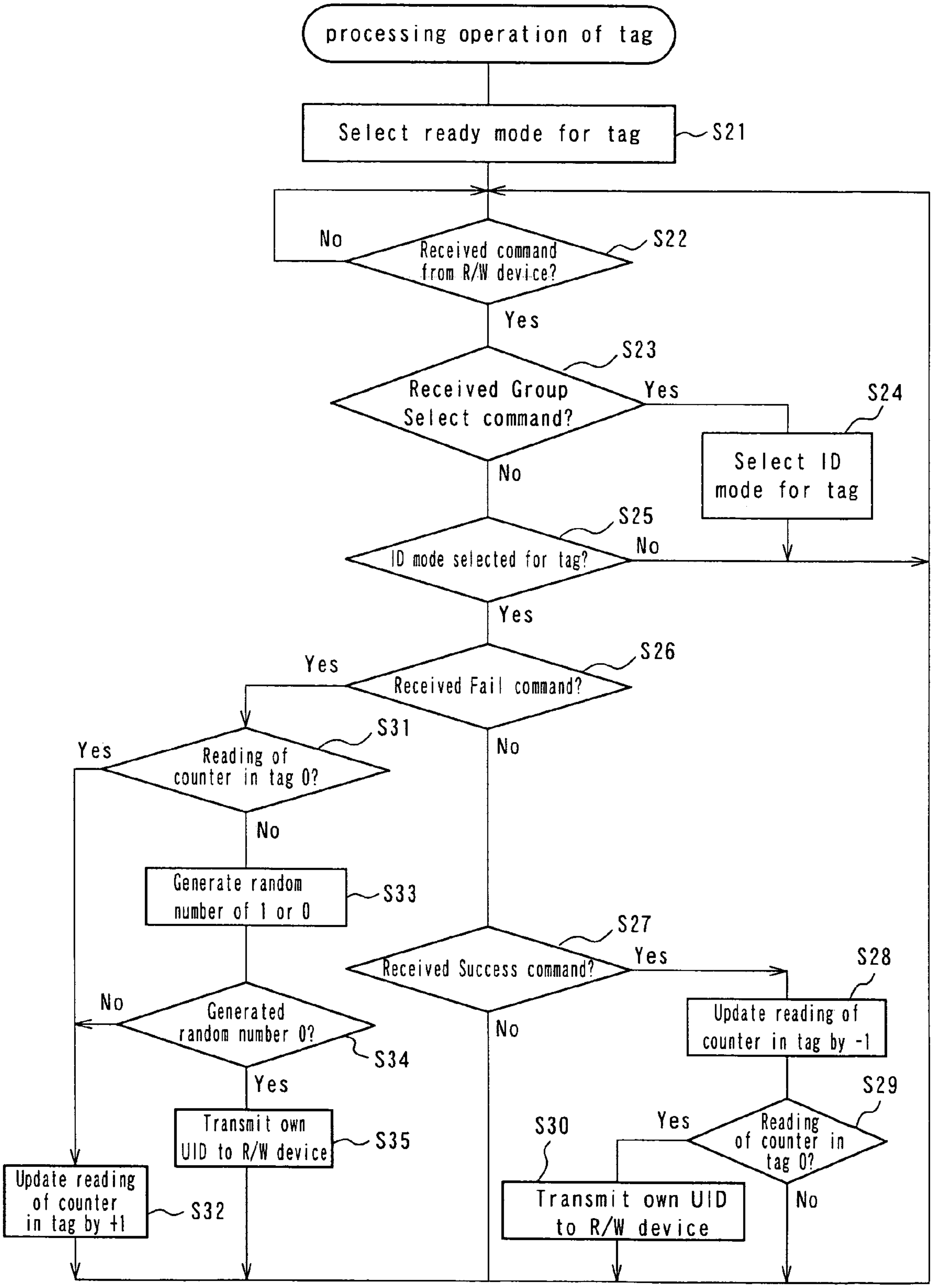
FIG. 22 is a flow chart of the operation of a tag in a conventional anti-collision process.

Now, the processing operation of initializing the slave tags and the master tag(s) will be described below by referring to FIG. 20. The PC carries out an anti-collision processing operation by way of the read/write device and acquires the UIDs of all the tags including the slave tags and the master tag(s) (P11). As the PC identifies the UID of the master tag (assuming that the master tag is provided with a UID that can be discriminated from the UIDs of the other tags), it handles all the tags with the UIDs other than the UID of the master tag as slave tags and writes and stores the UIDs in the master tag (P12). In the case where some slave tags operate also as so many master tags as in the eighth embodiment, the PC may assign a master tag to any UID group and store the UIDs of the slave tags of the group in the master tag.

After the initialization, the information in the master tag can be updated in a similar manner when a slave tag is added. More specifically, an anti-collision processing operation is carried out for the slave tags and, if it is determined that there is a UID of a slave tag that is not registered in the master tag, it is written to the master tag appropriately.

The present invention is described above in detail by way of preferred embodiments. Thus, the present invention provides a wireless tag access control program which causes the computer of a wireless tag access control device according to the invention to execute the processing operation of any of the flow charts described above and illustrated in the accompanying drawings. More specifically, such a program can be executed by the computer of a wireless tag access control device according to the invention when it is stored in a computer-readable recording medium. Computer-readable recording mediums that can be used for the purpose of the present invention include transportable recording mediums such as CD-ROMs, flexible disks, DVD disks, magnetic optical disks and IC cards along with data bases that retain computer programs, other computers, their data bases and transmission mediums on communication lines.

What is claimed is:

1. A wireless tag system comprising:

a plurality of wireless slave tags which have respective unique IDs;

a plurality of wireless master tags arranged for said slave tags and storing the unique IDs of said slave tags; and a wireless tag access control device which accesses said master tags to acquire the unique IDs of said slave tags from said master tags and subsequently accesses said slave tags by using the acquired unique IDs of the slave tags.

2. The system according to claim 1, wherein dedicated commands are defined respectively for said master tags and said slave tags and said wireless tag access control device selectively accesses either said master tags or said slave tags by using the corresponding one of said dedicated commands.

3. The system according to claim 1, wherein group addresses are defined respectively for said master tags and said slave tags and said wireless tag access control device selectively accesses either said master tags or said slave tags by specifying the corresponding one of said group addresses.

4. The system according to claim 1, wherein a plurality of combinations of a master tag and slave tags are provided and at least a super master tag storing the unique IDs of said plurality of master tags is provided for said plurality of master tags; and said wireless tag access control device being adapted to access said super master tag in order to acquire the unique IDs of said plurality of master tags and access said master tags by using the acquired unique IDs of the master tags.

5. The system according to claim 1, wherein at least one of said master tag and at least one of said slave tag are combined to operate as a single tag and the unique IDs of the slave tags stored in said master tags include its own unique IDs.

6. The system according to claim 1, wherein said master tag is facsimiled in numbers and the facsimiled master tags are identifiable.

7. The system according to 1, wherein said master tags store positional information of the slave tags in correspondence to the unique IDs of the slave tags stored in said master tags.

8. A wireless tag access control device which accesses wireless tags comprising:

a unique ID acquiring section which accesses at least a master tag provided for a plurality of slave tags and acquiring the unique IDs of the slave tags stored in the master tag; and a slave tag accessing section which accesses the slave tags by using the unique IDs of the slave tags acquired by the unique ID acquiring section.

9. The device according to claim 8, wherein dedicated commands are defined respectively for said master tags and said slave tags so that either said master tags or said slave tags are selectively accessed by using the corresponding one of said dedicated commands.

10. The device according to claim 8, wherein group addresses are defined respectively for said master tags and said slave tags so that either said master tags or said slave tags are selectively accessed by specifying the corresponding one of said group addresses.

11. The device according to claim 8, further comprising:

a positional information acquiring section for acquires positional information of said slave tags corresponding to the acquired unique IDs of the slave tags; and said device being adapted to access the slave tags according to the unique IDs and the positional information.

12. A wireless tag access control method which accesses a plurality of wireless tags, said method being adapted to provide at least a master tag storing the unique IDs of a plurality of slave tags which have respective unique IDs, said method comprising:

a slave tag UID acquiring step which accesses the master tag and acquires the unique IDs of the plurality of slave tags stored in the master tag; and a slave tag accessing step which accesses the slave tags by using the acquired unique IDs of the slave tags.

13. The method according to claim 12, wherein dedicated commands are defined respectively for said master tags and said slave tags; and either said master tags or said slave tags are selectively accessed by using the corresponding one of said dedicated commands.

14. The method according to claim 12, wherein group addresses are defined respectively for said master tags and said slave tags; and either said master tags or said slave tags are selectively accessed by specifying the corresponding one of said group addresses.

15. The method according to claim 12, wherein a plurality of combinations of a master tag and slave tags are provided and at least a super master tag storing the unique IDs of said plurality of master tags is provided for said plurality of master tags; and said wireless tag access control method being adapted to access said super master tag in order to acquire the unique IDs of said plurality of master tags and access said master tags by using the acquired unique IDs of the master tags.

16. The method according to claim 12, wherein at least a master tag is facsimiled in numbers from the master tags and slave tags and the facsimiled master tags are identifiable, and each tag is identified and selectively accessed.

17. The method according to claim 16, wherein an identifying section is provided for each tag to indicate the tag to be in use or not in use and, when an unusable state is detected for at least one of the facsimiled master tags, the information stored in the master tag detected as unusable and the information stored in the other facsimiled master tags is written in the facsimiled master tags not in use, and the tags in which the information is written are indicated to be in use by the identifying section so as to make said other master tags and said master tag facsimiled master tags.

18. A wireless tag access control program which causes a computer to execute a wireless tag access control method which accesses a plurality of wireless tags, said program being adapted to provide at least a master tag storing the unique IDs of a plurality of slave tags which have respective unique IDs, said program comprising:

a slave tag UID acquiring step which accesses the master tag and acquiring the unique IDs of the plurality of slave tags stored in the master tag; and a slave tag accessing step which accesses the slave tags by using the acquired unique IDs of the slave tags.

19. The program according to claim 18, wherein dedicated commands are defined respectively for said master tags and said slave tags; and a computer is caused to selectively access either said master tags or said slave tags by using the corresponding one of said dedicated commands.

20. A wireless tag comprising a wireless antenna and a memory section and adapted to be accessed by a read/write device by means of a wireless signal, said wireless tag storing unique IDs of wireless tags other than itself in the memory section so that they may be accessed by said read/write device by means of the unique IDs.

* * * * *